United States Patent
Buesching et al.

(10) Patent No.: US 8,554,978 B2
(45) Date of Patent: Oct. 8, 2013

(54) AUTOMATION APPLIANCE AND METHOD FOR ACCELERATED PROCESSING OF SELECTED PROCESS DATA

(75) Inventors: Dirk Buesching, Vlotho (DE); Hans-Herbert Kirste, Landesbergen (DE); Sebastian Koopmann, Petershagen (DE); Oliver Wetter, Minden (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 106 days.

(21) Appl. No.: 13/106,235

(22) Filed: May 12, 2011

(65) Prior Publication Data

US 2011/0283027 A1  Nov. 17, 2011

(30) Foreign Application Priority Data

May 12, 2010 (DE) ............. 10 2010 020 446

(51) Int. Cl.
 G06F 13/40 (2006.01)
(52) U.S. Cl.
 CPC ................ *G06F 13/4054* (2013.01)
 USPC ............................. 710/315; 710/311
(58) Field of Classification Search
 USPC .................................. 710/305, 315
 See application file for complete search history.

(56) References Cited

U.S. PATENT DOCUMENTS

| | | | |
|---|---|---|---|
| 7,508,690 B2* | 3/2009 | Albers | 363/144 |
| 7,725,635 B2* | 5/2010 | Wei et al. | 710/244 |
| 7,743,192 B2* | 6/2010 | Wei et al. | 710/244 |
| 7,757,028 B2* | 7/2010 | Druke et al. | 710/244 |
| 7,913,016 B2* | 3/2011 | Wei et al. | 710/244 |
| 7,969,985 B1* | 6/2011 | Cline et al. | 370/394 |
| 8,065,460 B2* | 11/2011 | Wei et al. | 710/244 |
| 8,301,821 B2* | 10/2012 | Ihle et al. | 710/315 |
| 2002/0131452 A1 | 9/2002 | Bruckner et al. | |
| 2003/0051053 A1* | 3/2003 | Vasko et al. | 709/246 |
| 2004/0139264 A1* | 7/2004 | Gros et al. | 710/305 |
| 2004/0254700 A1 | 12/2004 | Fehr et al. | |
| 2006/0031577 A1* | 2/2006 | Peluso et al. | 709/243 |
| 2006/0136648 A1* | 6/2006 | Gros et al. | 710/305 |

(Continued)

FOREIGN PATENT DOCUMENTS

| | | |
|---|---|---|
| DE | 19645861 A1 | 7/1998 |
| DE | 100 06 265 | 8/2001 |

(Continued)

*Primary Examiner* — Ryan Stiglic
(74) *Attorney, Agent, or Firm* — Renner, Otto, Boisselle & Sklar, LLP

(57) ABSTRACT

An automation appliance (6) having at least one field bus interface (12) for connection to a field bus (2) and transmission of data packets (DP) with process data (PD) via the field bus (2) and having at least one local bus interface (21) for connection to a local bus (7) and transmission of process data (PD) between field devices (9a, 9b, 9c) connected to the local bus (7) and the automation appliance (6), and having means for converting the data packets (DP) coming from the field bus (2) into a data stream (DS) for the local bus (7) and for converting the data stream (DS) sent from the local bus (7) to the automation appliance (6) into data packets (DP) for the field bus (2) is described. The automation appliance (6) has an acceleration unit (10) for selecting process data ($PD_S$) that are to be converted in accelerated fashion and for separately converting the selected process data ($PD_S$), which acceleration unit is set up such that the selected process data ($PD_S$) are output at an earlier time than unselected process data ($PD_N$) which are transmitted as well in combination with the selected process data ($PD_S$).

10 Claims, 5 Drawing Sheets

(56) References Cited

U.S. PATENT DOCUMENTS

| | | | |
|---|---|---|---|
| 2008/0043766 A1* | 2/2008 | Bryngelson et al. | 370/412 |
| 2008/0228976 A1* | 9/2008 | Wei et al. | 710/110 |
| 2008/0228978 A1* | 9/2008 | Wei et al. | 710/244 |
| 2008/0229084 A1* | 9/2008 | Wei et al. | 712/244 |
| 2009/0010204 A1* | 1/2009 | Pratt et al. | 370/328 |
| 2009/0046675 A1* | 2/2009 | Pratt et al. | 370/337 |
| 2009/0268744 A1* | 10/2009 | Ihle et al. | 370/401 |
| 2009/0292844 A1* | 11/2009 | Ihle et al. | 710/110 |
| 2010/0057959 A1* | 3/2010 | Korrek | 710/110 |
| 2010/0064082 A1* | 3/2010 | Ihle et al. | 710/106 |
| 2010/0205340 A1* | 8/2010 | Wei et al. | 710/110 |

FOREIGN PATENT DOCUMENTS

| | | |
|---|---|---|
| DE | 10006265 B4 | 8/2001 |
| DE | 10140861 A1 | 10/2002 |
| DE | 10220334 A1 | 11/2003 |
| DE | 10304637 A1 | 8/2004 |
| DE | 10360210 A1 | 7/2005 |
| DE | 60026676 T2 | 11/2006 |
| DE | 102006008466 A1 | 8/2007 |
| DE | 102007038964 A1 | 3/2008 |
| DE | 102006045306 A1 | 4/2008 |
| DE | 102007017835 A1 | 10/2008 |
| DE | 102007049043 A1 | 4/2009 |
| DE | 102007049044 A1 | 4/2009 |
| DE | 102008019277 A1 | 10/2009 |
| DE | 102008039580 A1 | 3/2010 |
| WO | 03019868 A1 | 3/2003 |
| WO | 2004040864 A1 | 5/2004 |
| WO | WO 2009/021974 | 2/2009 |

* cited by examiner

AUTOMATION APPLIANCE AND METHOD FOR ACCELERATED PROCESSING OF SELECTED PROCESS DATA

FIELD OF INVENTION

The invention relates to an automation appliance having at least one field bus interface for connection to a field bus and transmission of data packets with process data via the field bus and having at least one local bus interface for connection to a local bus and transmission of process data between field devices which can be connected to the local bus and the automation appliance, and having means for converting the data packets coming from the field bus into a data stream for the local bus and for converting the data stream sent from the local bus to the automation appliance into data packets for the field bus.

The invention also relates to a method for accelerated processing of selected process data from a data packet or data stream.

BACKGROUND

WO 2009/021974 A2 discloses a realtime controller for industrial communication using the Ethernet communication standard and EtherCAT data packets or EtherCAT frames. The automation appliance is connected to an Ethernet data network as a field bus via a microprocessor. The communication with field devices connected to the input/output modules is effected via a local bus using EtherCAT data packets. To speed up the communication, two EtherCAT data frames are provided for the local bus, with one data frame being provided only for the data sent from the automation appliance to the input/output modules and another data frame being provided only for the data sent from the input/output modules to the automation appliance (field bus controller).

DE 100 06 265 B4 discloses an apparatus for controlling the data interchange by a communication subscriber in a serial master/slave communication system. The apparatus can be flexibly adjusted to suit communication requirements by virtue of the apparatus being set up to replace predetermined communication data. This allows a communication subscriber to actively engage in the communication data flow. In this way, communication subscribers, i.e. input/output modules, can communicate with one another without an automation appliance as master.

Against this background, it is an object of the present invention to provide an improved automation appliance which allows accelerated data transmission between a field bus and a local data bus.

SUMMARY

The object is achieved with the automation appliance of the type cited at the outset by virtue of the automation appliance having an acceleration unit for selecting process data that are to be converted in accelerated fashion and for separately converting the selected process data, which acceleration unit is set up such that the selected process data are output at an earlier time than unselected process data which are transmitted as well in combination with the selected process data.

During the monitoring of data packets or data streams which are sent via the field bus or the local bus to the automation appliance, process data that are to be processed in accelerated fashion are selected. The effect achieved by this is that these selected process data can be processed and converted in accelerated fashion in comparison with the unselected process data which have been received by the automation appliance in the same period in combination with the selected process data, so as then to forward them at an earlier time than the unselected process data.

In this context, process data are understood to mean all data in an automation system which are interchanged between field devices and superordinate controllers, particularly measurement data, control data and state data.

By way of example, the automation appliance may be a field bus coupler in a modular input/output system in an automation installation.

Field devices are, in particular, sensors and actuators which are used in automation systems, such as initiators, limit switches, valves, contactors, indicator lights, etc.

The selected process data can be output directly via a direct interface of the automation appliance, which direct interface can have field devices connected to it directly without an interposed bus. Alternatively, the selected process data can be output by virtue of their being incorporated into a data stream for the local bus at an earlier time than the unselected process data which are received as well in combination are incorporated, in order to transmit the process data to the field devices in a usual manner via a local bus and input/output modules connected thereto, e.g. using a ring bus method.

The selected process data can be output onto the local bus without checking the correctness of the received data packets or data streams in order to reduce the delay time when forwarding the data, whereas the unselected process data are converted and output only after it has been established that the associated data packet or data stream is correct.

However, it is particularly advantageous if the automation appliance is set up to check the correctness of the received data packets and/or data streams, and the selected process data are output only after correctness has been established. However, the processing and conversion of the selected process data should then actually be prepared, so that the selected process data already prepared for output can be output without an unnecessary time delay after the correctness of the data packet or data stream with which these selected process data were transmitted has been established.

It is also advantageous if the automation appliance is set up to select and output the selected process data in each field bus transmission cycle of a data packet or in each local bus transmission cycle of field device data from a data stream, whereas the unselected process data are processed only in the event of update requests. Hence, the selected process data are provided with absolute priority and are selected and forwarded on a regularly repeated basis. In this case, the transmission of data packets, which is regularly recurrent in cycles, to the field bus and of field device data on the local bus is utilized. In automation systems, the transmission usually has cycle times defined as times which elapse between the transmission and the next repetition of a process. In this case, cycle times are stipulated for the regular sampling, evaluation and transportation processes which take place in the input/output modules, the local bus, field bus coupler, field bus and controllers. The accelerated forwarding of the selected process data is then effected on the basis of such cycle times. The accelerated forwarding results in a reduction in the cycle time.

By way of example, the data can be selected using a piece of hardware logic with a state recognition unit for recognizing the state of the presence of data that are to be processed in accelerated fashion from data packets or a data stream. Such a state recognition unit can be used with simple means to select data that are to be processed in accelerated fashion from the data packets or data streams and to convert and output them separately from the unselected process data in a manner accelerated at hardware level. To this end, the automation appliance is set up to process the unselected process data using software on a microcontroller in a manner which is known per se, while the selected process data are processed using hardware logic more quickly than the unselected process data. By way of example, this is accomplished with a piece of logic which is controlled by the state recognition unit for direct memory access, said logic being used to read buffered, selected data from a memory and to process them further using hardware logic for the purpose of output without any complex further processing by software.

An acceleration unit of this kind which is provided for the purpose of observing data streams and which selects and separately converts the data that are to be processed in accelerated fashion may be integrated in an automation appliance or in a field bus controller in the automation appliance. Often, however, a field bus controller does not provide access to control signals, which means that it is then advantageous to provide a special field bus controller having an acceleration unit integrated therein and to connect it in parallel with an existing, conventional field bus controller which has no means for accelerated processing of data. The special field bus controller can optionally interact with the conventional field bus controller as an observer for control purposes.

Optionally, the automation appliance may have at least one direct interface for the direct connection of field devices without interposition of a local bus system. In that case, selected process data are output on the at least one direct interface, or signals that are to be processed in accelerated fashion which are present for the purpose of processing on at least one direct interface are converted by means of hardware logic so as then to incorporate them into data packets for the field bus as selected process data in accelerated fashion.

It is also an object of the present invention to provide an improved method for the accelerated processing of selected process data from a data packet or data stream.

The object is achieved by means of the following steps:
observation of a data stream on a local bus, which an automation appliance coupled to a field bus uses to communicate with at least one input and/or output module for the purpose of connection to at least one field device, or of data packets on a field bus,
selection of process data that are to be processed in accelerated fashion from the observed data packets and/or data streams,
processing of the selected process data separately from unselected process data which have been transmitted in combination with the selected process data, and
output of the selected process data at an earlier time than the unselected process data which are transmitted as well in combination.

Advantageous embodiments are described in the subclaims.

DESCRIPTION OF THE DRAWINGS

The invention is explained in more detail below using exemplary embodiments with reference to the appended drawings, in which.

DETAILED DESCRIPTION

Figure 1:
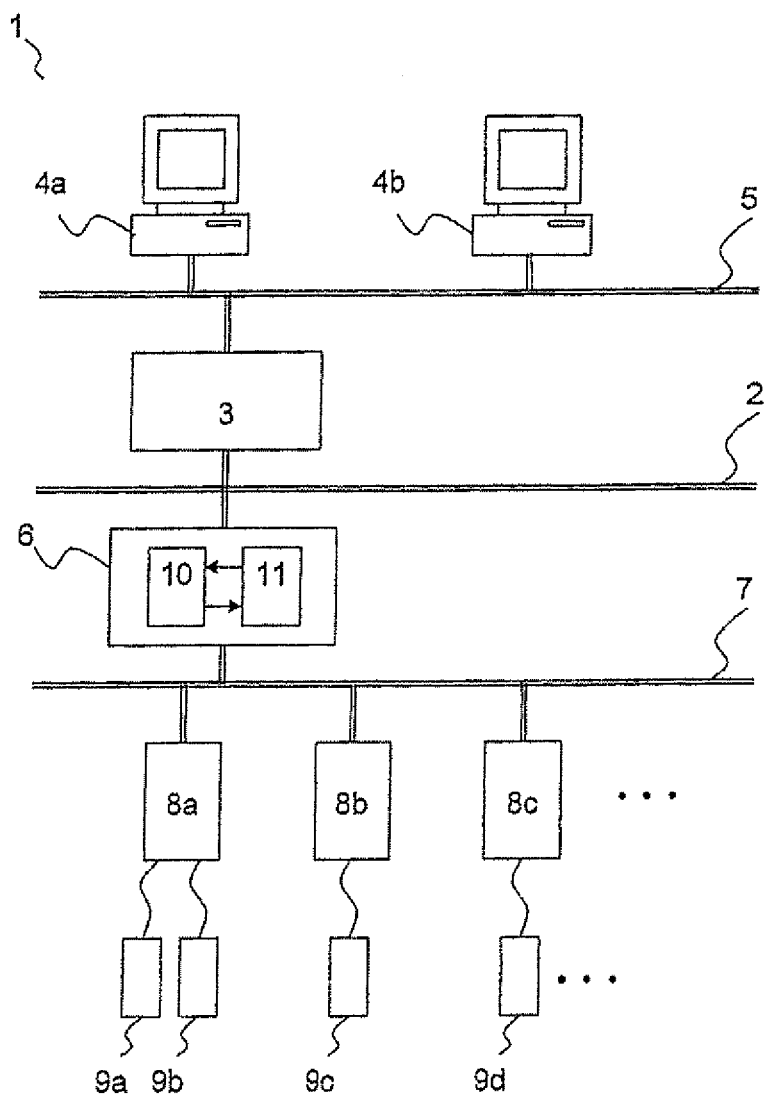
FIG. 1 shows a block diagram of an automation system having an automation appliance which is connected to a controller via a field bus and to input/output modules via a local bus.

FIG. 1 shows a block diagram of an automation system 1. Automation systems of this kind which are used in process, production, automation and buildings engineering use field buses 2 in order to capture physically distributed process data and, following processing thereof, to distribute them to programmable logic controllers 3 and possibly to control computers 4a, 4b.

To this end, the programmable logic controller 3 is connected to control computers 4a, 4b in one or more remote control rooms or control centers via a superordinate network 5 in a manner which is known per se. The control computers 4a, 4b may possibly have visual display devices for presenting process sequences.

In addition, the programmable logic controller 3 is connected to at least one automation appliance 6 in the form of a field bus coupler via the field bus 2. Such field bus couplers 6 are used to implement a modular input/output system in which process data from a field bus 2 are converted to a local bus 7 by the field bus coupler 6. The local bus 7 has input/output modules 8a, 8b, 8c connected to it which communicate with one another and with the field bus coupler 6 as an automation appliance, preferably via a ring bus as local bus 7. The input/output modules 8a, 8b, 8c have field devices 9a, 9b, 9c, 9d connected to them. By way of example, such field devices may be initiators, limit switches, valves, contactors, indicator lights or the like. An input/output module 8a, 8b, 8c can have one or more such field devices 9a, 9b, 9c, 9d connected to it, depending on the design of the input/output module 8a, 8b, 8c.

In this way, the modular I/O system formed from the automation appliance 6 in the form of a field bus coupler and the input/output modules 8a, 8b, 8c is a link between the field device level (sensor/actuator level) and the control and process level, which is formed by the programmable logic controller 3 and possibly the superordinate control computers 4a, 4b.

In such automation systems 1, the reaction times for fast, particularly realtime, controllers are an important criterion. In order to shorten the reaction times, the (bidirectional) conversion of process data between data packets transmitted on the field bus and a data stream from the local bus 7 by the field bus coupler 6 is reduced by virtue of process data that are to be converted in accelerated fashion from the data packet and/or data stream which is sent to the field bus coupler 6 being selected and being converted separately from the unselected process data which were transmitted in combination with the selected process data in the same data stream or data packet and being output by the field bus coupler 6 at an earlier time than the unselected process data.

To this end, the automation appliance 6 has an acceleration unit 10 for selecting process data and for separately converting these selected process data which is operated in parallel with a conventional conversion unit 11 in the field bus coupler 6.

In the automation system 1, the programmable logic controller 3 undertakes the actual evaluation of input data, the data combination and the provision of output data for the input/output modules 8a, 8b, 8c and field devices 9a, 9b, 9c, 9d connected to the latter. The field bus coupler 6 is used for converting the process data received via the local bus 7 to produce data packets that can be forwarded to the programmable logic controller 3 via the field bus 2, and vice versa.

The present automation system 1 does not provide for accelerated data transmission by dispensing with a field bus coupler and direct implementation of the field bus for the input/output modules 8a, 8b, 8c and possibly for the field devices 9a, 9b, 9c, 9d and removal of the function of the field bus coupler 6 to the programmable logic controller 3 and/or the input/output modules 8a, 8b, 8c. On the contrary, the present automation system 1 avoids committing to one particular communication protocol standard both for the local bus 7 and for the field bus 2, so that sufficient flexibility is afforded.

This is because an automation system 1 with a local bus 7 makes use of the advantage that different master controllers and field buses are designed in optimum fashion for their respective tasks and sectors. A modular I/O system allows free selection of the respective field bus 2 and local bus 7 by the user on the basis of optimum suitability for the application. In addition, the properties of the input/output modules 8a, 8b, 8c are independent of the field bus 2, which means that a group of input/output modules 8a, 8b, 8c in different forms, such as digital input modules, digital output modules, analog input modules, analog output modules, encoders, measurement transducers, etc., are available with a local bus system which is supported by one manufacturer. This is because all the input/output modules 8a, 8b, 8c from a manufacturer are equipped with identical interfaces for the local bus 7. They are then coupled to a particular field bus 2 simply by selecting a suitable field bus coupler 6 which supports the specific field bus communication standard. This makes application functions easily extendable and interchangeable. In addition, the local bus 7 is optimized in terms of bandwidth and performance independently of the field bus 2.

While retaining the flexibility of a modular I/O system with conversion of process data between the local bus 7 and the field bus 2, the reaction times are now shortened by optimizing the field bus coupler 6 such that the processing is parallelized when converting data packets from the field bus 2 into data streams for the local bus 7, and vice versa.

Figure 2:
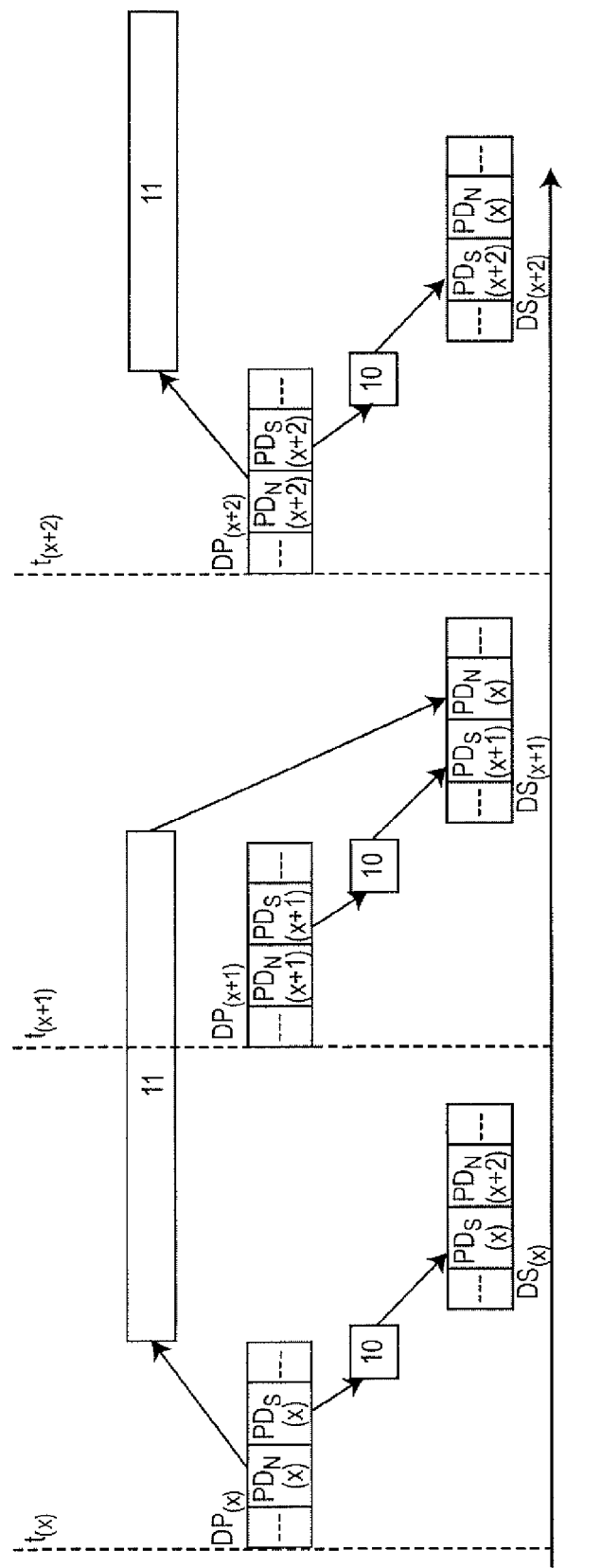
FIG. 2 shows a graph of the conversion of unselected and selected process data independently of one another.

FIG. 2 shows an outline of the sequence—executed by the automation appliance 6—of the separate conversion of selected process data $PD_S$ that are to be processed in accelerated fashion and unselected process data $PD_N$ over time t. A data packet DP(x) sent to the automation appliance 6 is transmitted on the basis of a communication protocol prescribed by the field bus 2 in the relevant field bus protocol format and is received by the automation appliance 6 starting at the time t(x). It contains a number of process data items PD which are sent to associated field devices 9a, 9b, 9c, 9d, .... Following the arrival of a data packet DP(x), the conversion unit 11 in the automation appliance 6 checks the correctness of the currently received data packet DP(x). This can be done by evaluating a check key transmitted with the data packet DP(x), for example. Such a check key may be a checksum as a cross-check sum for the values of the data packet DP(x) or the like, for example. When the correctness has been checked, the process data PD from the data packet DP(x) are then processed further and converted. This involves the process data PD being processed in the conversion unit 11 with conventional microcontrollers or microprocessors using software routines. This can be handled very flexibly and easily, but has the drawback of a time delay.

In order to shorten the reaction times, the automation appliance 6 therefore has an acceleration unit 10 which selects process data $PD_S$ that are to be transmitted in accelerated fashion from the data packets DP(x) and processes and converts them separately at hardware level, e.g. using a field-programmable circuit (FPGA). In this way, these selected process data $PD_S$ can be incorporated into a data stream DS for the local bus 7 and output there at an earlier time than unselected process data $PD_N$ which are transmitted in the same data packet $DP_{(x)}$ or in preceding data packets $DP_{(x-1)}$, $DP_{(x-2)}$, etc. and which do not need to be converted and transmitted in accelerated fashion.

It is evident that, before the arrival of the next data packet $DP_{(x+1)}$ at the time $t_{(x+1)}$, a data stream $DS_{(x)}$ with process data $PD_S(x)$ that are to be forwarded in accelerated fashion from the data packet $DP_{(x)}$ received at the time t(and with unprioritized process data $PD_N(x-2)$ from a data packet $DP_{(x-2)}$ received two times beforehand are forwarded. A corresponding situation is evident with the subsequent periods starting at the times $t_{(x+1)}$ and $t_{(x+2)}$. Depending on the availability of the data, the unprioritized process data $PD_N$ are embedded room into the data streams $DS_{(x+i)}$ with i as an integer with a positive or negative arithmetic sign, the process data $PD_S$ that are to be forwarded in accelerated fashion being given priority.

Optionally, it is also conceivable for these selected data $PD_S$ that are to be converted in accelerated fashion to be provided directly on the automation appliance 6 on a direct interface to which field devices 9a, 9b, 9c, 9d can be connected directly without interposition of a local bus 7.

The sequence shown for the data transmission from the field bus 2 to the local bus 7 and the input/output modules 8a, 8b, 8c connected thereto is assisted vice versa by the automation appliance 6 in corresponding fashion in order to select process data $PD_S$ that are to be forwarded in accelerated fashion from a data stream DS from the local bus 7 and to convert them into output data for the programmable logic controller 3 and to output them to the controller 3 in a data packet DP via the field bus.

It is evident that the result is that the selected process data $PD_S$ that are to processed in accelerated fashion are forwarded at an earlier time than the unselected process data $PD_N$, even though the unselected process data $PD_N$ were transmitted in combination with the selected process data $PD_S$ at an earlier time in preceding data packets or in the same data packet or data stream section.

Figure 3:
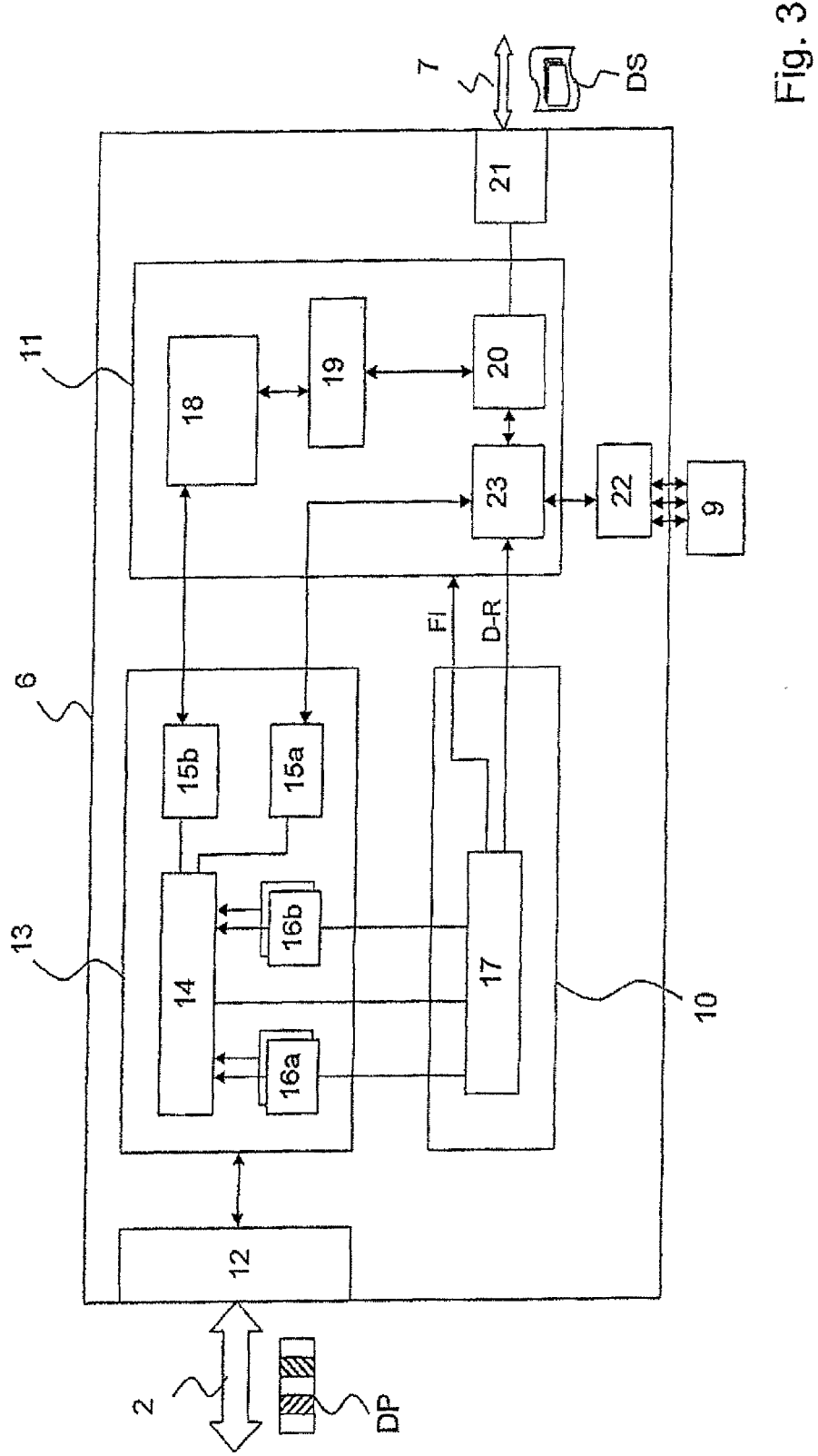
FIG. 3 shows a block diagram of an automation appliance with an acceleration unit for selecting process data that are to be converted in accelerated fashion.

FIG. 3 shows a block diagram of an automation appliance 6 having a physical field bus interface 12, a field bus controller 13 and the acceleration unit 10. The field bus controller 13 contains a field bus MAC and is bidirectionally connected to the physical field bus interface 12. A data processing unit 14 for processing the field bus data packets is set up to evaluate the header information (header) in the data packets DP, which is used to address the data packets DP. In addition, the data processing unit 14 is set up to extract the process data PD from the data packets DP and to store them in downstream buffer stores 15a, 15b. The performance of the data processing in the data processing unit 14 is controlled by state machines 16a, 16b on the basis of the events arising when data packets DP arrive.

The buffer-stored process data PD are then passed to a conversion unit 11 for the local bus 7, which process the process data PD further with a processor-controlled processing unit 18 using a microcontroller or microprocessor under software control, buffer-stored them as a process map in a buffer store 19 and incorporate them into data streams DS for the local bus 7 using a coprocessor 20. The conversion unit 11 is connected to a physical local bus interface 21 to the local bus 7.

The automation appliance 6 has an acceleration unit 10 with a state recognition unit 17 which is connected to the state machines 16a, 16b in order to detect process data $PD_S$ that are to be processed in accelerated fashion from the data packets DP. Such detected process data $PD_S$ that are to be processed in accelerated fashion are then selected and routed to the buffer store 15a for the purpose of accelerated further processing. In this case, the state recognition unit 17 sends a data provision signal D-R which is used to forward the process data $PD_S$ that are to be processed in accelerated fashion from the buffer store 15a directly by means of hardware-level processing. To this end, the selected process data $PD_S$ can either be output directly on the automation appliance 6 via a direct interface 22 or can be incorporated into a data stream DS from the local bus 7 by the coprocessor 20.

The selected process data $PD_S$ can be preprocessed for the purpose of forwarding before the actual check on the correctness, including the completeness, of a data packet DP or data stream DS, e.g. using the checksum. If a data packet DP or data stream section is erroneous, the forwarding of these can be stopped using the control line FI (invalid frame—Frame invalid) in order to accelerate selected process data $PD_S$ which have already been converted for the purpose of forwarding to a local bus.

The data transmission between a programmable logic controller 3 and a field bus coupler 6, which operates with a local bus 7 and input/output modules 8a, 8b, 8c connected thereto, therefore takes place as follows:
1) the field signals are captured by the input/output modules 8a, 8b, 8c and are transmitted as the data stream DS via the local bus 7 to the field bus coupler 6.
2) the protocol of the local bus 7 is converted to the protocol of the field bus 2;
3) a field bus telegram is sent by the field bus coupler 6 via the field bus 2 and a field bus telegram is received and processed by the programmable logic controller 3;
4) a reaction, contained in the field bus telegram, by the programmable logic controller 3 is sent to the field bus coupler 6 and the field bus telegram is received by the field bus coupler 6;
5) the field bus protocol is converted to the protocol of the local bus 7 by the field bus coupler 6;
6) the telegram is sent from the field bus coupler 6 via the local bus 7 and the respective addressed input/output module to the connected field devices 9a, 9b, 9c, 9d.

For the conversion in steps 2) and 5), process data $PD_S$ that are to be processed in accelerated fashion are then selected and are converted at hardware level, while the other, unselected process data $PD_N$ are converted in conventional fashion under software control.

The steps executed by the field bus coupler 6 can be handled sequentially or in a kind of parallel processing as a prefetch sequence.

In order to ensure that the process data PD are consistent, data buffers are required in the automation appliances 6, but have an adverse effect on latencies. Latencies are signal delays which arise, by way of example, as a result of transit times in hardware, software and, by way of example, as a result of double buffers in the field bus 2 and local bus 7 subregions.

Furthermore, jitter arises in the conversion unit 11 as a result of the data processing with a central microprocessor unit. Jitter describes the time variance in a signal without knowledge of the cause thereof. In the present automation system, jitter relates to the expected time at which a field signal is intended to be available. The acceleration unit 10 allows latency and jitter to be significantly reduced.

FIG. 3 also shows that the automation appliance 6 also allows direct output of the selected process data $PD_S$ via the direct interface 22. The selected process data $PD_S$ are incorporated into the data stream DS for the local bus 7 using a direct memory access unit 23 which allows direct memory access to the buffer store 15a and hence allows the process data transfer between the field bus controller 13 and the conversion unit 11.

The coprocessor 20 is provided for the purpose of producing data streams DS and processing the process data PD for the local bus 7.

The acceleration unit 10 itself may be set up to assess the validity of field bus telegrams using check sums so as to obtain this information in accelerated fashion. As an alternative or additionally, this check can be performed as conventionally in the field bus controller 13.

Figure 4:
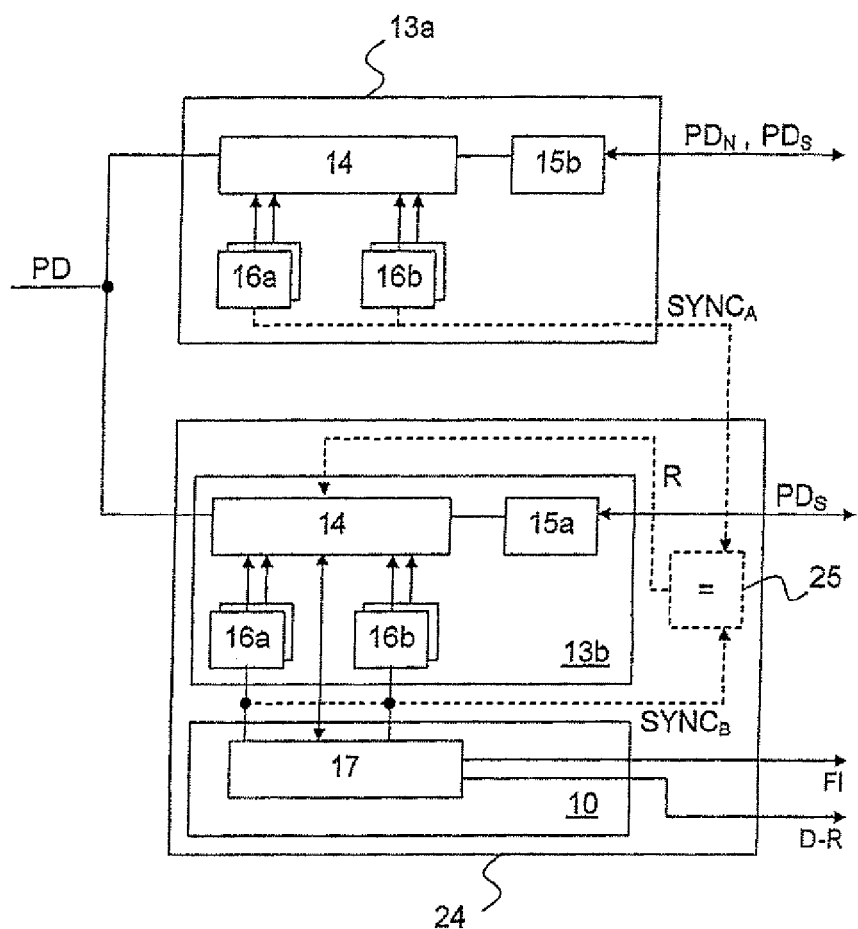
FIG. 4 shows a block diagram of a conventional field bus controller and of a field bus controller which is optionally connected in parallel as an observer and which has an integrated acceleration unit for the selection and accelerated conversion of selected process data.

FIG. 4 shows part of an automation appliance in which, in parallel with a conventional field bus controller 13a, a special field bus controller 13b is connected which has functionality for recognizing data that are to be forwarded in accelerated fashion and for selecting and forwarding such data that are to be forwarded in accelerated fashion. The conventional field bus controller 13a does not provide any signal outputs on its interfaces, which are required for the selection and accelerated transmission of selected process data $PD_S$. The parallel-connected, special field bus controller 13b may be of similar design to a conventional field bus controller 13a. This special field bus controller 13b additionally provides signal outputs which are used by the acceleration unit 10 in order to select process data $PD_S$ that are to be processed in accelerated fashion and to send off the data provision signal D-R. The control line FT (invalid frame—Frame invalid) can be used to stop the selected process data $PD_S$ which have already been forwarded if a data packet DP or data stream section DS is erroneous.

For control purposes, the special field bus controller 13b can optionally operate as an observer for the conventional field bus controller. On account of the different hardware of the field bus MAC in the conventional field bus controller 13a and the field bus MAC in the special field bus controller 13b, different handling times and transit times may arise. It is therefore necessary to readjust the special field bus controller 13b and particularly its field bus MAC using the synchronization signals $SYNC_A$ from the conventional field bus controller 13a. To this end, the signal connections shown in dashes and a comparator logic unit 25 are provided. The conventional field bus controller 13a routes synchronization signals $SYNC_A$ to the comparator 25, which compares the synchronization signals $SYNC_A$ with corresponding synchronization signals $SYNC_B$ in respect of time and produces a control signal R which is supplied to the data processing unit 14 of the special field bus controller 13b in order to synchronize the special field bus controller 13b to the conventional field bus controller 13a.

Figure 5:
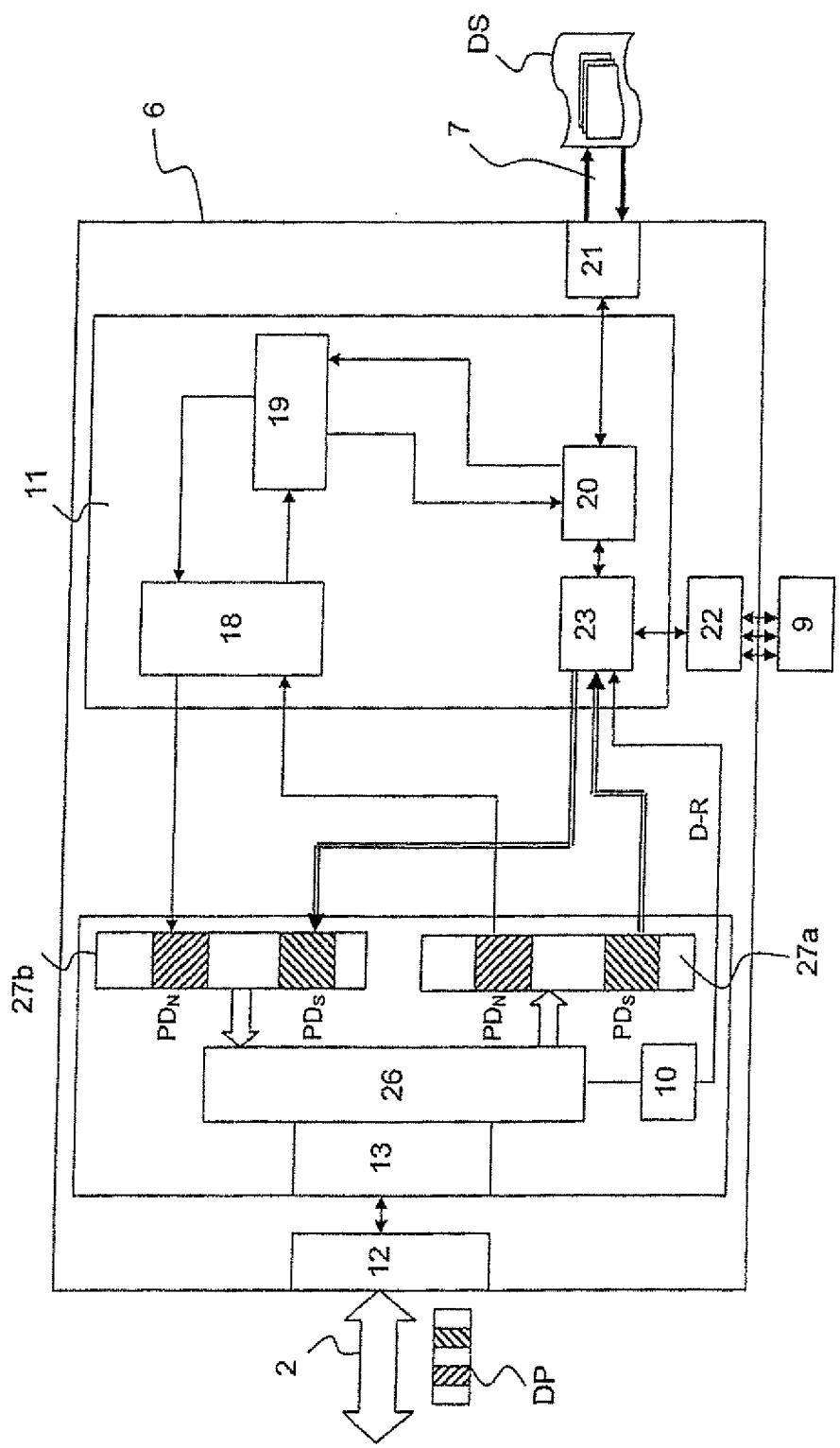
FIG. 5 shows a block diagram of an automation appliance having a direct memory access unit for the accelerated processing of process data by virtue of direct memory access to verified process data which are buffer-stored in the buffer store of a field bus controller.

The conventional field bus controller 13a forwards all the process data $PD_N$ and $PD_S$, while the special field bus controller 13b forwards only the selected process data $PD_S$ that are to be forwarded in accelerated fashion. A downstream direct memory access unit 23, which is outlined in FIGS. 3 and 5, is responsible for no data being sent in duplicate. In the start up phase, the direct memory access unit 23 is configured and is provided with all the information regarding which data come from where, to what destination they need to be sent and with what data length they need to be sent.

FIG. 5 shows a block diagram of another embodiment of an automation appliance 6. In this case too, a physical field bus interface 12 (field bus PHY), a field bus controller 13 (field bus MAC) and a downstream logic unit 26 are provided. The logic unit 26 is used to evaluate the data packets DP which have been received from the field bus 2 and to actually check them for correctness, including completeness. The verified process data PD are then written to the buffer store 27a. For the process data PD which are sent to the field bus 2, a buffer store 27b is provided which is accessed by the field bus logic unit 26 in order to convert the process data PD into data packets DP based on the respective field bus protocol and to send them off to connected subscribers via the field bus 2 using the physical field bus interface 12.

In this exemplary embodiment, the process data PD received via the field bus 2 have already been verified when they are written to the buffer store 27a.

In this case, the selection and accelerated processing of process data PD are performed by the acceleration unit 10. The acceleration unit 10 cooperates with the direct memory access unit 23 and allows direct access to the buffer stores 27a and 27b. The coprocessor 20 can be used to incorporate the process data $PD_S$ that are to be forwarded in accelerated fashion and which have been selected by targeted memory access into a data stream DS for the local bus 7 with as little time delay as possible and to output them via the local bus 7. The data are output via the local bus 7 using a local bus interface 21. Alternatively, direct data output via a direct interface 22 to field devices 9 which are connected directly to the automation appliance 6 is conceivable.

The unselected process data $PD_N$ transmitted in combination with the selected process data $PD_S$ are likewise stored in the buffer stores 27a, 27b. These are accessed in a manner known per se by a processor-controlled processing unit 18 in the conversion unit 11, which processes and converts the unselected process data $PD_N$ under software control for the purpose of storage in a further process map buffer store 19. These unselected process data $PD_N$ are then in turn incorporated into a data stream DS for the local bus 7 by the coprocessor 20, while the selected process data $PD_S$ are forwarded cyclically in each transmission cycle of the field bus 2 or local bus 7.

The invention claimed is:

1. An automation appliance comprising:
   at least one field bus interface for connection to a field bus and for transmission of data packets (DP) with process data (PD) via the field bus;
   at least one local bus interface for connection to a local bus and for transmission of process data (PD) between field devices connected to the local bus and the automation appliance;
   means for converting the data packets (DP) coming from the field bus into a data stream (DS) for the local bus and for converting the data stream (DS) sent from the local bus to the automation appliance into data packets (DP) for the field bus; and
   an acceleration unit for selecting the process data (PD) that are to be converted in accelerated fashion and for separately converting the selected process data ($PD_S$),
   wherein the acceleration unit is set up such that the selected process data ($PD_S$) are output at an earlier time than unselected process data ($PD_N$) which are transmitted as well as in combination with the selected process data ($PD_S$),
   wherein the acceleration unit is designed to select the process data (PD) as hardware logic with a state recognition unit for recognizing the state of the presence of the selected process data ($PD_S$) that are to be processed in accelerated fashion from the data packets (DP) or the data stream (DS), and
   wherein the automation appliance is set up to process the unselected process data ($PD_N$) using software with a processor-controlled processing unit, while the selected process data ($PD_S$) are processed using hardware logic more quickly than the unselected process data ($PD_N$) which are transmitted as well as in combination with the selected process data ($PD_S$).

2. The automation appliance according to claim 1, wherein the automation appliance is set up to check correctness of the received data packets (DP) and/or the received data stream (DS) and is set up to output the selected process data ($PD_S$) only after the correctness has been established.

3. The automation appliance according to claim 1, wherein the automation appliance is set up to select and to output the selected process data ($PD_S$) in each transmission cycle of the data packets (DP) or the data stream (DS) and is set up to process the unselected process data ($PD_N$) only in the event of update requests.

4. The automation appliance according to claim 1 further comprising;
   a first field bus controller, which has an integrated acceleration unit, is connected in parallel with a second field bus controller without an acceleration unit.

5. The automation appliance according to claim 1 further comprising:
   at least one direct interface for connection of the field devices,
   wherein the automation appliance is set up to output the selected process data ($PD_S$) via the at least one direct interface directly to the field devices connected to the at least one direct interface, and/or
   wherein the automation application is set up to process signals which are present on the at least one direct interface and to convert the signals into the selected process data ($PD_S$) for the purpose of accelerated incorporation into the data packets (DP) for the field bus at an earlier time than the unselected process data ($PD_N$) arriving in the same period via the local bus.

6. A method for the accelerated processing of selected process data ($PD_S$) from data packets (PD) and/or a data stream (DS) comprising:
   observation of the data stream (DS) on a local bus, which an automation appliance coupled to a field bus uses to communicate with at least one input and/or output module for the purpose of connection to at least one field device, or of the data packets (DP) on the field bus;
   selection of process data ($PD_S$) that are to be processed in accelerated fashion from the observed data packets (DP) and/or the observed data stream (DS);
   processing of the selected process data ($PD_S$) separately from unselected process data ($PD_N$) which have been transmitted in combination with the selected process data ($PD_S$), and
   output of the selected process data ($PD_S$) at an earlier time than the unselected process data ($PD_N$) which are transmitted as well as in combination; and
   processing the unselected process data ($PD_N$) using software with a processor-controlled processing unit, while the selected process data ($PD_S$) are processed using hardware logic more quickly than the unselected process data ($PD_N$) which are transmitted as well as in combination with the selected process data ($PD_S$),
wherein the selection of the process data (PD) is designed as hardware logic with a state recognition unit for recognizing the state of the presence of the selected process data ($PD_S$) that are to be processed in accelerated fashion from the data packets (DP) or the data stream (DS).

7. The method according to claim 6 further comprising:
incorporation of the selected process data ($PD_S$) into the data packets (DP) for the field bus or the data stream (DS) for the local bus at an earlier time than the unselected process data ($PD_N$) which are transmitted as well as in combination.

8. The method according to claim 6 further comprising:
checking of correctness of the received data packets (DP) and/or the received data stream (DS); and
incorporation of the selected process data ($PD_S$) following establishment of the correctness of the associated data packet (DP) or the associated data stream (DS) in which the selected process data ($PD_S$) were transmitted.

9. The method according to claim 6 further comprising:
processing of the unselected process data ($PD_N$) only in the event of update requests,
wherein the selection and the output of the selected process data ($PD_S$) are in each transmission cycle of the data packet (DP) or the data stream (DS).

10. The method according to claim 6 further comprising:
accelerated conversion of signals which are present on at least one direct interface from the at least one field device which is connected directly to the at least one direct interface into the selected process data ($PD_S$);
incorporation of the selected process data ($PD_S$) into the data packets (DP) for the field bus at an earlier time than the unselected process data ($PD_N$) arriving in the same period via the local bus; and
output of selected process data ($PD_S$) to the at least one direct interface of the automation appliance for the purpose of direct transmission to the at least one field device which can be connected to the at least one direct interface.

* * * * *